E. B. CHEREVOY.
Steam Heater.
No. 27,858.          Patented April 10, 1860.
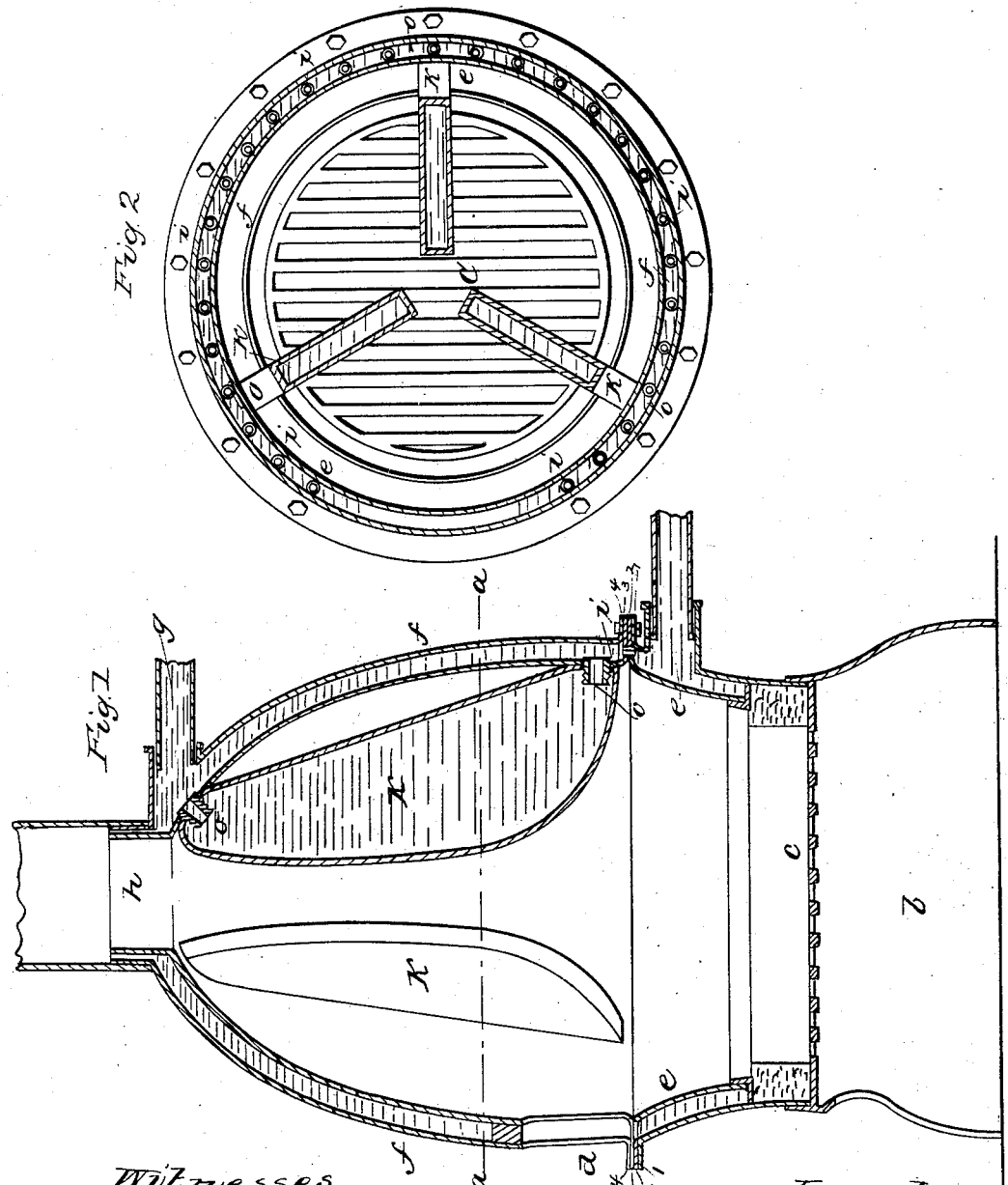

UNITED STATES PATENT OFFICE.

EDMUND B. CHEREVOY, OF NEW YORK, N. Y., ASSIGNOR TO HIMSELF AND THOMAS W. WEATHERED, OF SAME PLACE.

BOILER FOR HOT-WATER APPARATUS.

Specification of Letters Patent No. 27,858, dated April 10, 1860.

*To all whom it may concern:*

Be it known that I, EDMUND B. CHEREVOY, of the city and State of New York, have invented, made, and applied to use a certain new and useful Improvement in Furnaces for Hot-Water-Warming Apparatus; and I do hereby declare that the following is a full, clear, and exact description of the construction and operation of the same, reference being had to the annexed drawing, making part of this specification, wherein—

Figure 1, is a vertical section of my said furnace, and Fig. 2, is a plan of the same below the line $a, a$.

My said invention relates to furnaces used to heat circulating water in apparatus for warming houses and buildings; and consists in a series of hollow flat water chambers arranged around inside a dome shaped boiler formed by a double casing containing water; whereby I am enabled to obtain a great extent of surface, in small compass, and the flat circulating water chambers receive the direct action of the heat in such a manner that the efficiency of my apparatus is greatly promoted.

In the drawing $b$, is the ash pit, $c$, the fire grate, $d$, the door for fuel, $e$, is the hollow water casing surrounding the fire and into which the circulating hot water is returned; $f$, is the dome shaped or conical casing over the fire; the flanges of these casings turn outward as shown and are calked with cement between the flanges 1, 2, 3, and 4.

The water circulates from the casing $e$, into the hollow dome $f$, through the thimbles $i, i$, and passes away by the pipe $g$ the same as in my patent of June 28th 1859 to which this present invention is an improvement specially adapted to large boilers.

$k, k, k$, are a series of flat hollow water chambers arranged around inside the dome $f$, immediately over the fire, and extending up to the upper part of the dome near the escape smoke flue $h$. Each of these water chambers is formed flat, and I prefer that they be cast hollow of iron, and each one is to be connected at top and bottom respectively to the inner casing of the dome $f$ before the outer casing is placed on, and for this purpose I make use of a hollow screw thimble or pipe $o$, screwed in through both thicknesses as shown; one at the top and the other at the bottom. The water circulates through these hollow flat water chambers as shown, and on account of their proximity to the fire and their extent of surface act in the most efficient manner in heating the circulating water by the heat transmitted from the ascending heated products of combustion.

I do not claim a flat water chamber in itself as one has before been arranged within a cone, and extended across the entire space; but I am not aware of any previous instance in which a series of radial water chambers have been arranged as shown and connected by the screw thimble to the interior of the dome, therefore

What I claim as my invention and desire to secure by Letters Patent is—

The radial water chambers ($k, k, k,$) arranged within the conical water casing as set forth, when connected to the said casing or dome by the screw thimbles as specified.

In witness whereof I have hereunto set my signature this sixteenth day of February 1860.

E. B. CHEREVOY.

Witnesses:
LEMUEL W. SERRELL,
THOS. GEO. HAROLD.